United States Patent
Brustad et al.

[11] Patent Number: 5,772,950
[45] Date of Patent: Jun. 30, 1998

[54] METHOD OF VACUUM FORMING A COMPOSITE

[75] Inventors: Val G. Brustad, Enumclaw; David L. Hoshor, Puyallup; Donald A. Jensen, Kent; Andrew E. Modin, Enumclaw, all of Wash.

[73] Assignee: The Boeing Company, Seattle, Wash.

[21] Appl. No.: 299,487

[22] Filed: Aug. 31, 1994

[51] Int. Cl.⁶ ............................ B29C 43/10; B32B 31/20
[52] U.S. Cl. .................... 264/510; 156/285; 156/222; 156/382; 156/583.3; 264/313; 264/316; 425/388; 425/389
[58] Field of Search ................................ 156/583.3, 285, 156/286, 382, 222; 264/510, 313, 316; 425/388, 389

[56] References Cited

U.S. PATENT DOCUMENTS

| | | |
|---|---|---|
| 3,614,811 | 10/1971 | Johnson . |
| 3,642,415 | 2/1972 | Johnson ................................ 425/389 |
| 3,811,982 | 5/1974 | Jacobsen ................................ 156/285 |
| 3,967,996 | 7/1976 | Kamov et al. . |
| 4,032,387 | 6/1977 | Sugiyama et al. ................... 156/583.3 |
| 4,475,976 | 10/1984 | Mittelstadt et al. .................... 425/389 |
| 4,576,776 | 3/1986 | Anderson ................................ 264/510 |
| 4,882,118 | 11/1989 | Megarry ................................ 264/510 |
| 4,886,442 | 12/1989 | McCowin et al. ..................... 425/388 |
| 4,980,013 | 12/1990 | Lowery .................................. 156/443 |
| 5,139,604 | 8/1992 | Mitchell ................................ 156/479 |
| 5,318,647 | 6/1994 | Mitchell ................................ 156/216 |
| 5,427,518 | 6/1995 | Morizot et al. ....................... 156/583.3 |
| 5,454,895 | 10/1995 | Imparato ................................ 156/286 |

FOREIGN PATENT DOCUMENTS

| | | |
|---|---|---|
| 0 147 872 | 7/1985 | European Pat. Off. . |
| 2 049 535 | 12/1980 | United Kingdom . |

*Primary Examiner*—Michele K. Yoder
*Attorney, Agent, or Firm*—Christensen O'Connor Johnson & Kindness PLLC

[57] ABSTRACT

A composite hot drape vacuum forming method and apparatus. The apparatus includes an elongate vacuum chamber (12) having a lid (14) and a housing (16). An inflatable seal (26) is disposed between the lid (14) and the housing (16). Inflation of the inflatable seal (26) creates on airtight vacuum chamber. A heating blanket (36) is located in the bottom of the vacuum chamber (12). An inflatable bladder (28) is located on top of the heating blanket and extends approximately over the length of the vacuum chamber. The interior of the inflatable bladder is in fluid connection with the exterior of the vacuum chamber. Composite charges (40) are placed within the vacuum chamber on top of the vacuum bladder (28). Lay-up mandrels (42) are placed on top of the unformed composite charges and the vacuum chamber is closed and sealed. The composite charges (40) are heated using the heating blanket (36). The interior of the vacuum chamber is then evacuated. As the interior is evacuated, the inflatable bladder expands forming the composite charges (40) around the lay-up mandrels (42). After forming, the pressure in the interior of the vacuum chamber (12) is equalized and the lid (14) is opened. The formed composite charges and mandrels are then removed.

7 Claims, 9 Drawing Sheets

METHOD OF VACUUM FORMING A COMPOSITE

FIELD OF THE INVENTION

The present invention relates to methods and apparatus for forming composite material lay-ups or charges prior to curing.

BACKGROUND OF THE INVENTION

The use of composite materials in the manufacture of aircraft and other lightweight structures has increased steadily since the introduction of such materials. Composite materials have a high strength-to-weight ratio and stiffness, making them attractive in the design of lightweight structures. One drawback to using composite materials in the past has been high fabrication costs. It has been difficult to produce composite parts for the same cost as comparable metal parts. The cost differential is especially notable in large-scale parts or parts having abrupt or complex contours.

One of the largest contributors to composite structure costs is the amount of manual labor required during fabrication. Composite parts having abrupt or complex contours must be formed by manually laying up individual layers of composite material on a lay-up mandrel. Larger parts having more gradual contours, for example, large wing skins, may be fabricated using automated tape laying machines.

Automated tape laying machines have a robotic arm that places individual layers of composite prepreg on a mandrel to form a composite part. Automated tape laying machines can place individual layers of prepreg at a high rate, thus possibly reducing fabrication time and cost. The mechanics of the automated tape laying machine limits its ability to place layers of composite prepreg over some geometries. Automated tape laying machines generally cannot place composite prepreg around abrupt curvatures or tight radiuses of curvature.

A common composite support structure used in the construction of aircraft and other light-weight structures is the "I"-beam or "I"-stringer. Due to the abrupt curvatures, I-beams and other beam-type composite structures are generally formed by manually placing layers of composite material over a lay-up mandrel. An automated cutting machine is used to cut each layer of composite prepreg to the proper shape. The individual layers of prepreg are then placed on two separate lay-up mandrels by hand. Once properly positioned, each layer of prepreg is manually formed to the exterior contours of the lay-up mandrel to form two "C-channels."

The C-channels and lay-up mandrels are then rotated so that the C-channels can be joined together along their vertical webs to form an I-beam. After joining, a triangular composite radius filler is placed in the triangular recesses formed in the center of the top and bottom flanges during joining. Top and bottom composite reinforcement layers are then manually placed on the top and bottom of the I-beam. The resulting I-beam is then bagged and autoclave cured.

The entire I-beam fabrication process is labor intensive and time consuming. In addition to labor required to place the composite material, labor is also required to manipulate the lay-up mandrels. Generally, lay-up mandrels are quite large and heavy, making them difficult to maneuver and hazardous. After the two C-channels are formed, a crane or similar handling device is used to engage the individual lay-up mandrels and transport them to an assembly table. The mandrels are then manually maneuvered, rotated and aligned using levers, etc. The two C-channels are then joined using a vacuum and a membrane in a laborious and time-consuming process. Once joined, a triangular radius filler is placed on the top of the I-beam. The lay-up mandrels are then rotated 180° so that a triangular radius filler may be applied to the bottom of the I-beam. Finally, the resulting I-beam and lay-up mandrels must be placed on a curing mandrel for vacuum bagging and subsequent curing.

In addition to being costly, the extensive use of manual labor during the fabrication process produces quality control problems. Individual layers of composite prepreg are often incorrectly positioned. Extensive manual handling during fabrication also increases the likelihood of foreign materials being introduced into the completed part. Incorrectly placed layers of composite and foreign material are large contributors to overall part rejection rates.

Thus, a need exists for methods and apparatus that reduce the amount of manual labor required during the fabrication of structures, particularly large structures, from composite materials. The present invention is directed to meeting this need.

SUMMARY OF THE INVENTION

The present invention is a composite hot drape vacuum former that may be used in conjunction with other equipment, disclosed in copending patent applications, to improve composite fabrication methods and apparatus. In accordance with the invention, unformed elongate composite panels or charges are laid up either manually or using an automated tape-laying machine. The composite charges are positioned within a vacuum chamber, adjacent one surface of an inflatable bladder. The interior of the inflatable bladder is maintained in fluid connection with the exterior of the vacuum chamber. After positioning the composite charges, elongate lay-up mandrels are centered on the surface of the composite charges opposite the inflatable bladder. The vacuum chamber is sealed and the temperature of the composite charges is elevated. The interior of the vacuum chamber is then evacuated. As the interior of the vacuum chamber is evacuated, a pressure differential is created between the interior of the vacuum chamber and the interior of the inflatable bladder. This pressure differential causes the inflatable bladder to expand. As the inflatable bladder expands, it forms the composite charges around the lay-up mandrels.

In accordance with other aspects of this invention, the vacuum chamber includes: a housing in which the composite charges are laid up and the mandrels are placed; and a lid for enclosing the housing. An inflatable seal is disposed between the lid and the housing. Inflating the inflatable seal creates an airtight seal between the lid and the housing.

In accordance with further aspects of this invention, prior to forming, the composite charges are maintained at an elevated temperature for a sufficient time to allow the resin in the composite charges to soften. Softening the resin makes the composite charges easier to form around the lay-up mandrels.

In accordance with still further aspects of this invention, end indexes are located at either end of the vacuum chamber to position the composite charges and lay-up mandrels lengthwise in the vacuum chamber.

In accordance with still other aspects of this invention, a plurality of location indexes are coupled to the sides of the vacuum chamber. Each side index is moveable between an indexing position and a stowed position. In the indexing position, each side index includes a composite index that extends at least partially across the width of the vacuum chamber to help to position the composite charges. Each side index includes a mandrel index that is rotatable between a deployed position and a retracted position. In the deployed position, the mandrel indexes help to position the lay-up mandrels on the composite charges.

The present invention reduces the time and cost of fabricating some composite parts such as I-beams. Unformed composite charges may be laid-up either by hand or using a more cost-effective automated tape-laying machine. The invention allows both the composite charges and lay-up mandrels to be quickly and easily positioned within the interior of the vacuum chamber. Once positioned, the composite charges are quickly and easily formed to the contour of the lay-up mandrels.

The present invention may be used with fabrication equipment disclosed in copending patent applications to improve composite fabrication methods. In one of the other copending patent applications, an articulating arm used to transport and rotate the lay-up mandrels is disclosed. In another patent application, a method and apparatus for joining two C-sections to form an I-beam is disclosed. In yet another patent application, a method and apparatus for removing the lay-up mandrels from the cured composite part is disclosed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
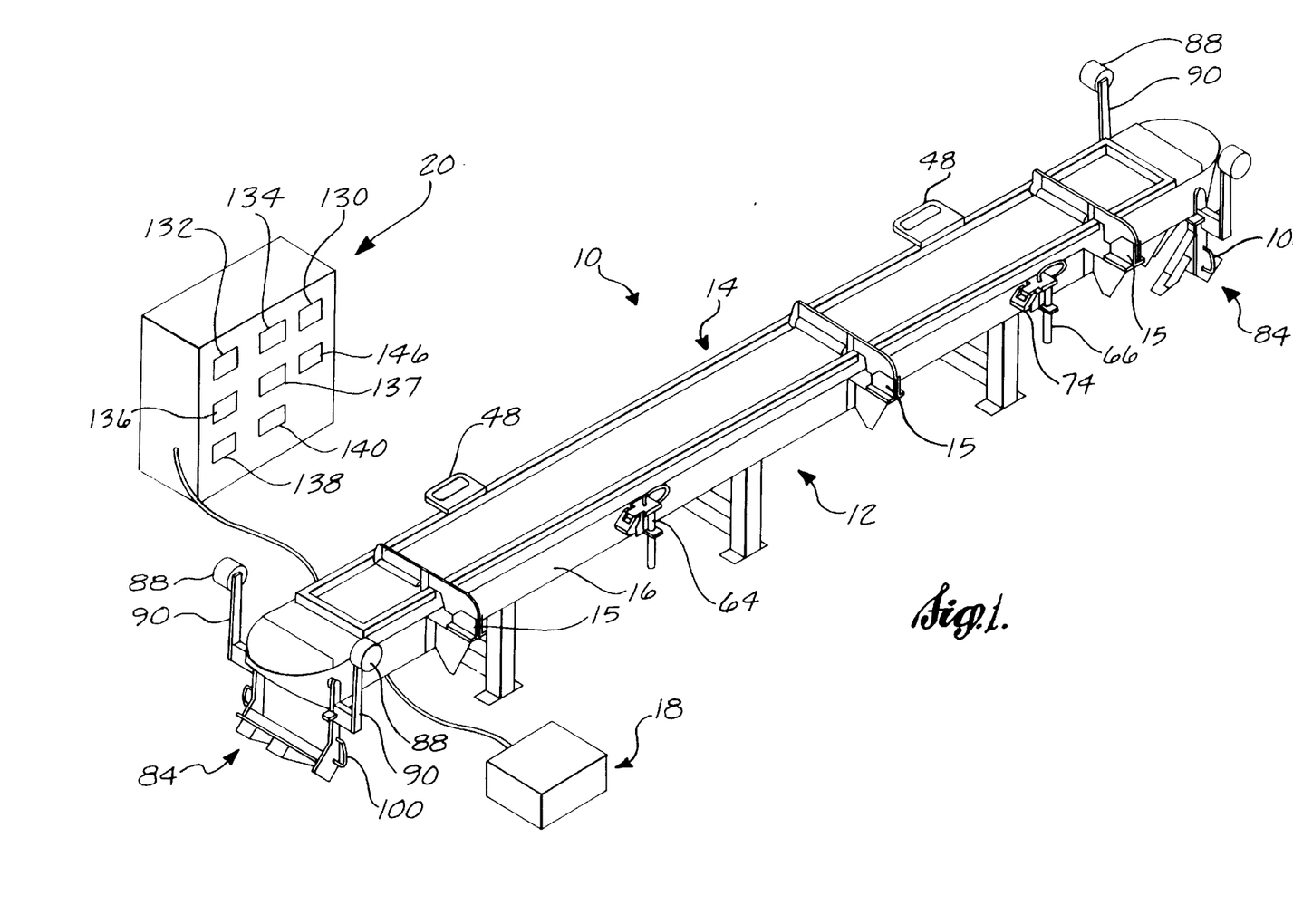
FIG. 1 is a perspective view of a preferred embodiment of a composite hot drape vacuum former formed in accordance with the present invention.

A composite hot drape vacuum former 10 formed according to the present invention is illustrated in FIG. 1. The vacuum former 10 includes an elongate vacuum chamber 12 having a lid 14 and a housing 16. The longitudinal dimension of the vacuum chamber is considerably larger than the width and height dimensions. The chamber length exceeds 45 feet in one actual embodiment of the invention. The lid 14 is hinged to one of the longitudinal sides of the housing 16, preferably using air spring hinges 15 or some other type of assisted hinge. Assisted hinges help to decrease the amount of force required to raise the lid. A number of handles 48 are located on the side of the lid opposite the hinges to assist an operator in opening the lid.

The lid 14 includes a flange 17 (FIGS. 10 and 11) that extends downward around the periphery of the lid. An inflatable seal 26 is mounted on the side of the flange 17 facing the sides of the housing 16 when the lid is closed. The seal 26 is a continuous loop that extends around the periphery of the flange. When the lid is closed and the inflatable seal 26 is inflated, an airtight seal is established between the lid and housing.

The interior cavity 38 (FIG. 11) of the vacuum chamber is connected to a vacuum pump 18 (FIG. 1) having sufficient capacity to evacuate the vacuum chamber in the manner described below. The vacuum former 10 also includes an electrical control console 20. The control console houses an electrical controller (described below) that controls the cycle used to form composite charges placed within the vacuum chamber 12.

A heating blanket 36 (FIGS. 10 and 11) or other suitable heating source is located in the vacuum chamber adjacent the bottom of the housing. The heating blanket 36 extends approximately the width and length of the vacuum chamber. It may be advantageous to place a thermal insulating material (not shown) between the bottom of the housing and the heating blanket. It may also be advantageous to place a heat transfer medium, such as an aluminum sheet, on top of the heating blanket to help equalize the temperature within the chamber. An inflatable bladder 28 is positioned on top of the heating blanket 36. The interior 37 (FIG. 11) of the inflatable bladder is vented to the exterior of the vacuum chamber through holes 122 (FIG. 7) in the ends of the bottom of the housing.

The inflatable bladder 28 may be formed of a single flexible membrane joined along the edges. Alternatively, the bladder may be formed of upper 30 and lower 32 (FIGS. 10 and 11) flexible membranes joined along the sides by seals or silicon extrusions 34. If a single flexible membrane is used, it is advantageous to place silicone extrusions 34 along the edges of the bladder to help control the shape of the bladder so that it lies flat within the chamber. The free ends of the inflatable bladder 28 are left open and extend through the holes 122 (FIG. 2) in either end of the vacuum chamber. The ends of the inflatable bladder 28 are folded over cylindrical flanges 24 that extend down from the bottom of the vacuum chamber (FIG. 12) around the holes 122. The ends are clamped against peripheral seals 126 that surround the cylindrical flanges by band clamps 128 or other suitable sealing devices. In alternate embodiments of the invention, other types of bladders or seals can be used.

Figure 10:
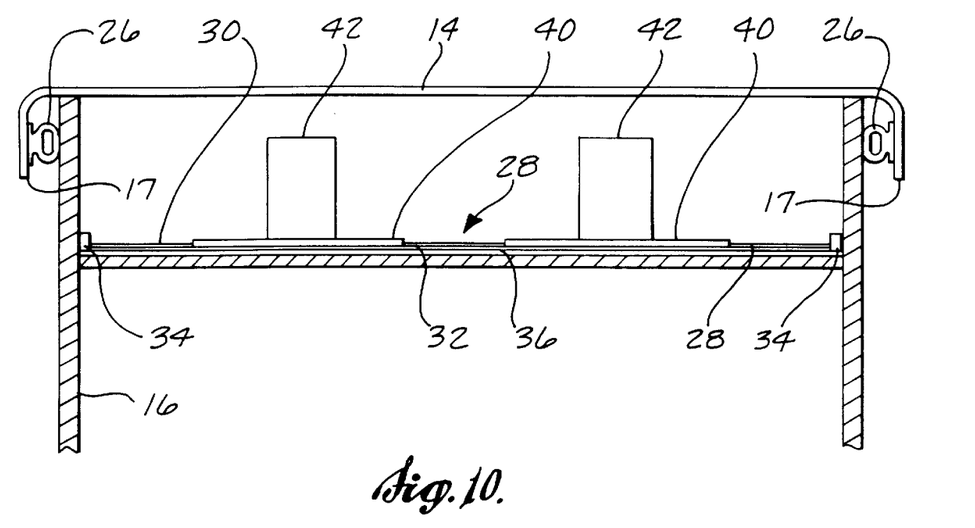
FIG. 10 is a cross section of the composite hot drape vacuum former, composite charges, and lay-up mandrels before evacuation of the vacuum chamber.
Figure 11:
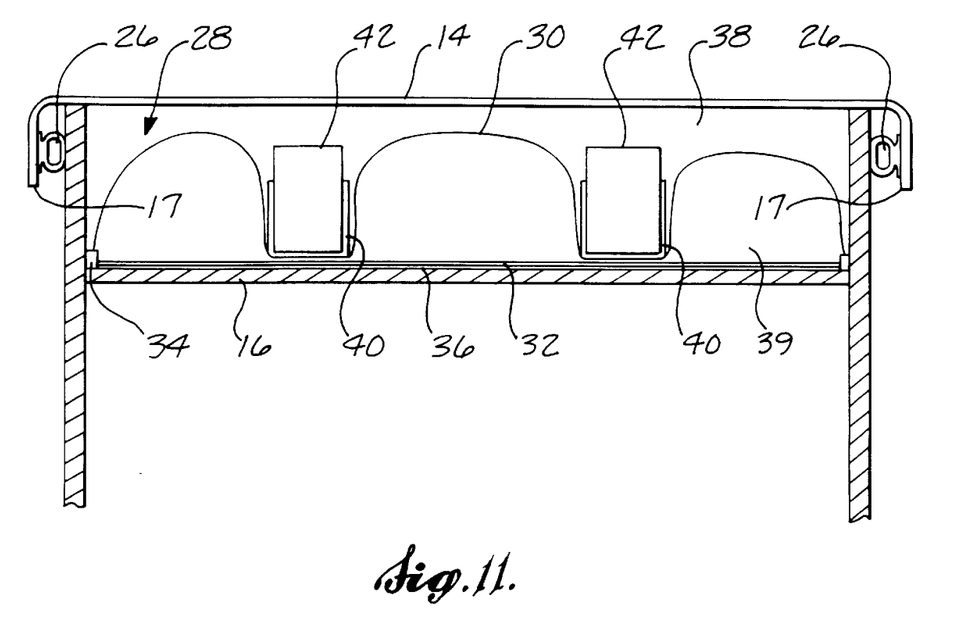
FIG. 11 is a cross section of the composite hot drape vacuum former, composite charges and lay-up mandrels after partial evacuation of the vacuum chamber.

During forming as described in detail below, the chamber is preheated by energizing the heating blanket 36. Two or more elongate composite charges 40 (FIGS. 10 and 11) are then placed lengthwise within the vacuum chamber 12. The composite charges 40 are positioned within the vacuum chamber using a plurality of side and end indexes 64 and 84 illustrated in FIG. 2 and described below. After the composite charges are positioned, a lay-up mandrel 42 is placed on top of each composite charge (FIGS. 10 and 11). The illustrated lay-up mandrels run substantially the entire length of the vacuum chamber 14 and have a rectangular cross section. Obviously, other numbers, shapes, and lengths of mandrels can be used, depending upon the desired shape of the resulting composite structure.

Once the lay-up mandrels 42 are positioned, the lid 14 is closed and the vacuum chamber 12 is sealed by inflating the inflatable seal 26. The heating blanket 36 is used to heat the composite charges 40, thus causing the epoxy or other resin within the composite charges to soften, making it easier to form the composite charges. After heating, the composite charges 40 are formed around the bottom and sides of the lay-up mandrels 42 by evacuating the interior 38 of the vacuum chamber.

As the vacuum chamber 12 is evacuated, a pressure differential is created between the interior 38 of the vacuum chamber and the interior 39 (FIG. 11) of the inflatable bladder 28. This pressure differential causes the inflatable bag to expand (FIG. 11). As the inflatable bladder expands, it forces the composite charges 40 upward around the sides of the lay-up mandrels 42. After the composite charges are fully formed, the pressure on the interior and exterior of the vacuum chamber is equalized, and the lid 14 raised. The lay-up mandrels 42 and formed composite charges 40 are then removed from the vacuum chamber.

The present invention's use of vacuum forming provides a number of advantages over prior art pressure forming. For example, using the present invention, a 14.69 psi pressure may be placed on the composite charges while imparting very little structural stress to the chamber because the pressure is equalized on both sides of the pressure boundary. To achieve comparable forces using a pressurized system, the chamber of the structure would need to be much heavier and stronger to withstand the high pressure differentials.

Turning now to a more detailed description of the presently preferred embodiment of the invention, prior to forming, the individual composite charges 40 are laid up either manually or through the use of an automated tape laying machine (not shown). It is advantageous to use an automated tape laying machine in order to decrease fabrication costs and reduce the occurrences of misplaced layers of composite material. The composite charges may be laid up flat or may be laid up over some type of curved or contoured lay-up mandrel. The former invention allows charges to be formed flat using an automated tape playing machine, thus eliminating laborious hand lay-up over a shaped mandrel.

The composite charges 40 (FIG. 2) are then loaded into the interior of the vacuum chamber 12. It is advantageous to use a carriage 50 or similar device to assist in the loading process. The illustrated carriage 50 includes two pairs of opposing wheels 52 rotatably attached to either side of the carriage. Each wheel 52 is grooved to receive the upper edge of the sides of the housing 16. The grooved wheels allow the carriage to move along the length of the vacuum chamber 12 without falling off of either side of the housing 16.

Figure 2:
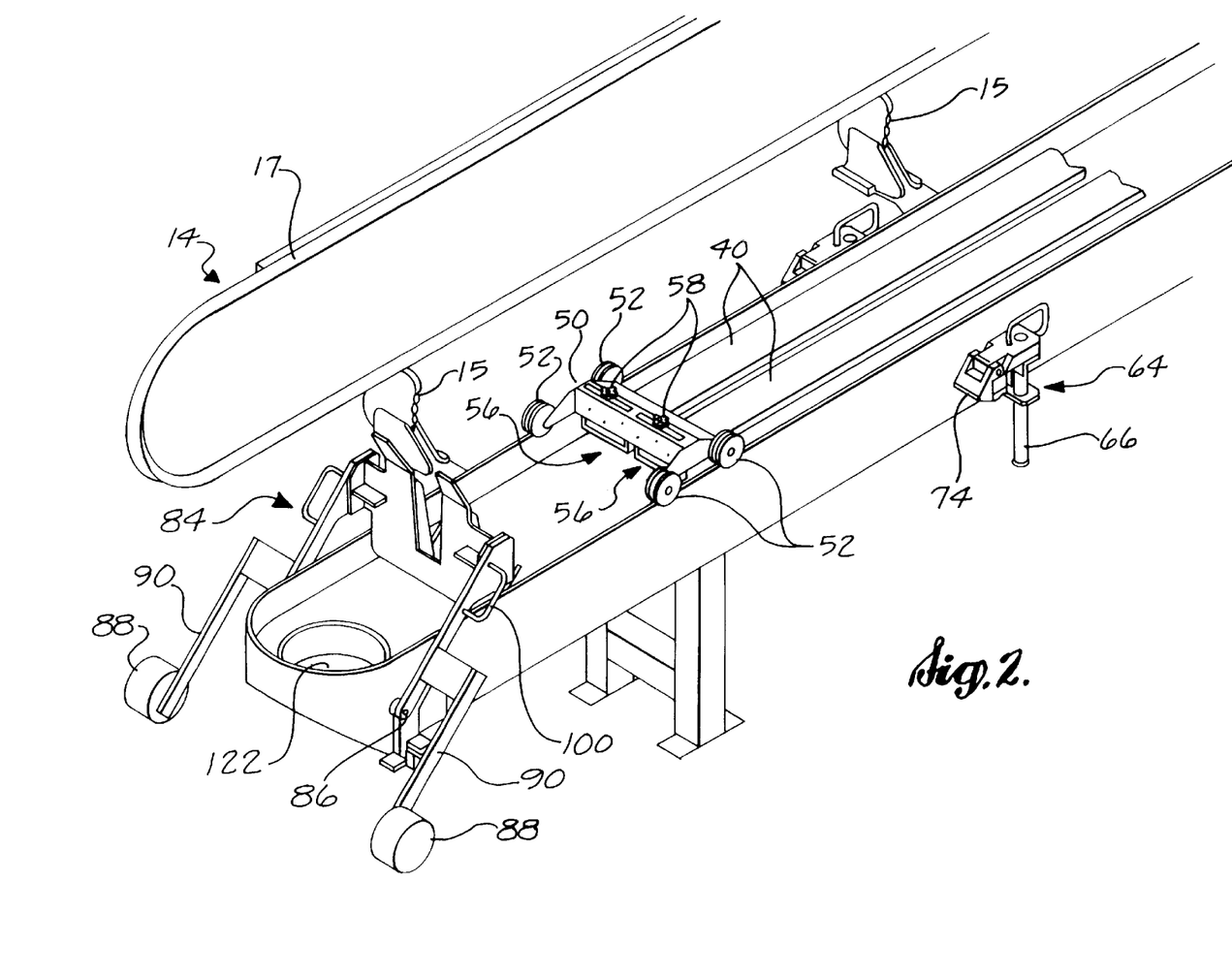
FIG. 2 is an enlarged perspective view of one end of the composite hot drape vacuum former of FIG. 1 with the lid open.

The center of the carriage 50 includes two releasable clamps 56. The clamps extend down below the bottom of the carriage. The open/closed state of the clamps is controlled by a thumb wheel 58 mounted on the end of a shaft attached to a clamping element that is raised to clamp an item to the bottom of the carriage. Each clamp 56 engages or releases the end of a composite charge by rotating the thumb wheel 58 to raise or lower the clamping element. The composite charges 40 are placed within the clamps 56 and then clamped by rotating the thumb wheels 58 in a manner well-known in the art. The carriage 50 and attached composite charges 40 are then maneuvered using a transfer cart (not shown) so that they are aligned lengthwise with the longitudinal axis of the vacuum chamber 12. Once aligned, the carriage 50 is placed on one end of the vacuum chamber so that the wheels 52 engage the sides of the housing 16. The carriage 50 is then rolled across the length of the vacuum chamber (FIG. 2). As the carriage is rolled, it pulls the composite charges 40 into the vacuum chamber 12. The final positions of the ends of the composite charges are regulated by an end index 84.

Figure 7:
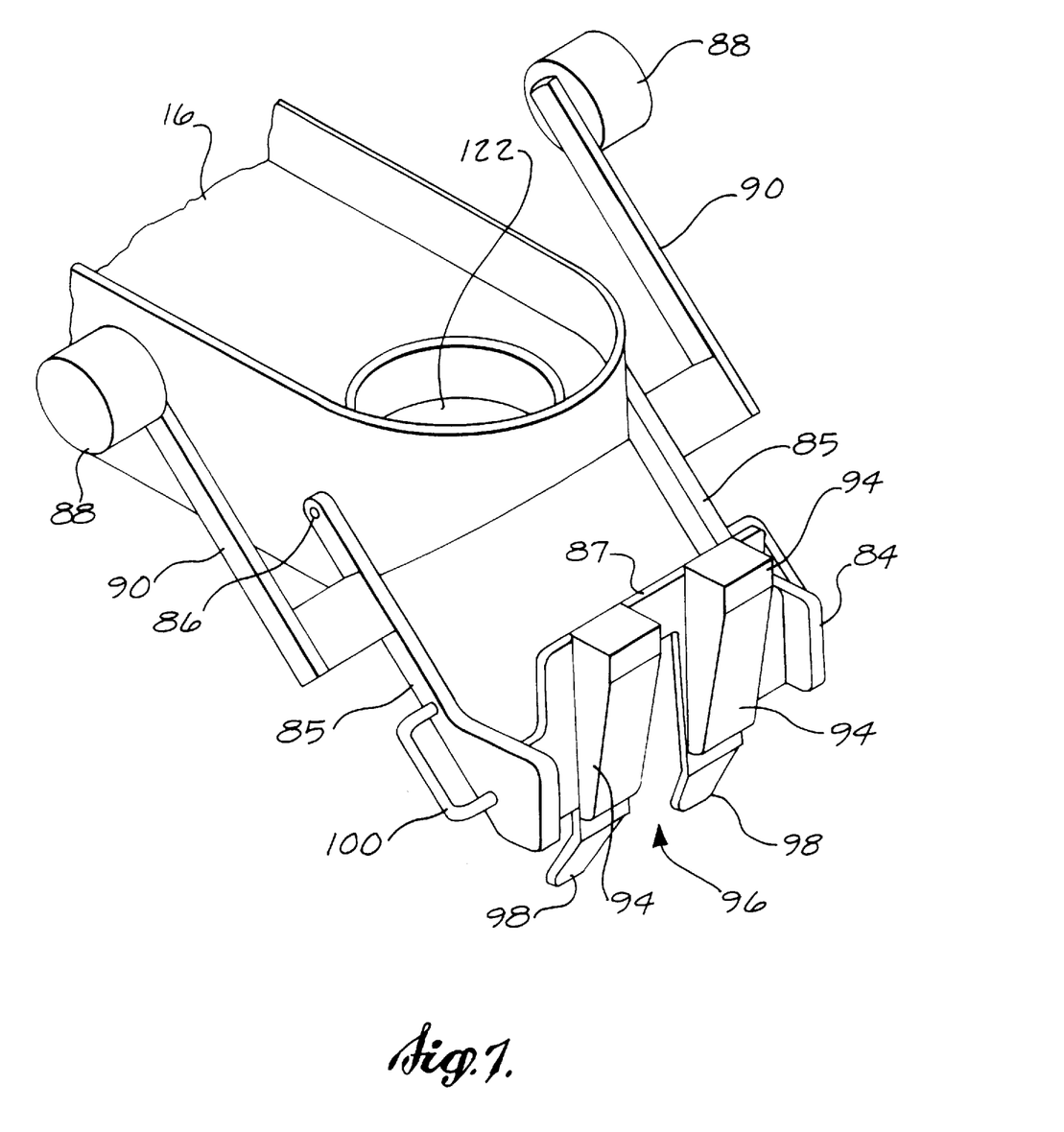
FIG. 7 is an enlarged perspective view of one end of the composite hot drape vacuum former of FIG. 1 showing an attached end index.

An end index 84 is rotatably mounted on both ends of the vacuum forming chamber 12. As shown in FIG. 7, each end index includes a pair of arms 85 pivotally attached at pivot points 86 to opposing sides of the end of the housing 16 on either side of the end holes 122. A plate 87 is rigidly affixed to the arms in any suitable manner. The plate is oriented such that it will be substantially vertical when the related end index is in the indexing position described below.

The plate 87 includes a center slot 96. Located on either side of the slot are guide flanges 98. The guide flanges 98 are integral with and form an obtuse angle with the main body of the plate 87. The direction of the guide flanges 98 is such that the flanges extend upwardly and toward the adjacent end of the housing 16 when the end index is in the indexing position described below. Two inclined indexing blocks 94 are affixed to each plate, one on either side of the slot 96. The blocks 94 are aligned with the guide flanges 98 such that the inclined sides of the blocks taper toward the guide flanges. The blocks 94 are located on the sides of the plates of the end indexes that face one another when the end indexes are in the indexing position described below. Handles are attached to the outer faces of the arms 85.

Each end index 84 also includes two counterweights 88 that are mounted on lever arms 90. The lever arms 90 are attached at one end to the outer face of the arms 85, slightly outwardly from the pivot points 86. The lever arms 90 extend outwardly, in a direction opposite of the arms 85. The counterweights 88 are affixed to the outer ends of the lever arms 88. Thus, the counterweights are located on the opposite side of the pivot points 86 from the plate 87 and indexing blocks 94. The weight of the counterweights 88 is chosen to counteract the weight of the plate 87 and indexing blocks 94. The counterweights allow an operator to easily rotate the end indexes from a stowed position, illustrated in FIG. 1, to a deployed or indexing position illustrated in FIG. 2 by grabbing and moving the handle 100 to cause the end indexes to rotate about the pivot points 86. In the deployed or indexing position (FIG. 2), the plates 87 are vertically positioned within the associated end of the housing 14 of the vacuum chamber 12. The innermost surface of the guide flanges 98 and the inclined surfaces of the inclined indexing blocks 94 serve as a locator for positioning the ends of the charges 40 as they are placed in the vacuum chamber 12.

The slot 96 serves as a centering means by which to center a crane or similar device that may be used to move lay-up mandrels into and out of the vacuum chamber 12. In use, an operator moves the end indexes 84 into their deployed or indexing position prior to placing the composite charges within the vacuum chamber 12. The operator then moves the composite charges into the vacuum chamber using the carriage 50. The composite charges are placed such that the ends of the charges are located adjacent the facing surfaces of the end indexing blocks 94.

After the composite charges 40 are moved into the vacuum chamber 12, they are unclamped from the carriage 50 by rotating thumb wheels 58. The carriage 50 is then removed from the vacuum chamber. Each composite charge 40 is then positioned across the width of the vacuum chamber 12 using a plurality of side indexes 64. The side indexes 64 are mounted along both sides of the vacuum chamber and are approximately equally spaced along the length of the vacuum chamber (FIG. 1). Although FIG. 3 illustrates only two side indexes, long versions of the invention would include more side indexes.

Each side index 64 includes a U-shaped bracket 65 affixed to the outer surface of the housing of the vacuum chamber 12 such that the arms of the U-shape are positioned above one another. Slidably mounted in the arms of the U-shaped bracket is a cylinder 66. Since the cylinders are slidably mounted, the cylinders can move up or down relative to the vacuum chamber as shown by arrow 68 (FIG. 4). Further, because the cylinders 66 are slidably mounted, the cylinders can be rotated about an axis that lies normal to the bottom of the vacuum chamber as shown by arrow 70.

Mounted atop each cylinder 66 is an indexing mechanism that includes an indexing plate 76, a composite charge index 72, and a mandrel index 74. One end of the plate is affixed to the top of the related cylinder 66. The indexing plate extends radially outwardly. The composite charge index 72 is integral with the indexing plate, at the outer end thereof, and the mandrel index is pivotally connected to the outer end of the indexing plate. The pivotal attachment is such that the mandrel index is rotatable between a deployed and non-deployed position. In the non-deployed position, the mandrel index lies atop the indexing plate 76. The indexing plate 76 and the composite charge index have an L-shape when viewed from the side, oriented such that the indexing plate forms the long leg of the L and the composite charge index forms a short downwardly extending leg. The lower end of the composite charge index has a rearwardly extending arm 73, i.e., an arm that extends outwardly in the same direction as the indexing plate 76, but below the indexing plate. The composite charge index also includes a foot 77 located at the bottom thereof below where the arm 73 meets the bottom of the composite charge index 72. The side of the composite charge index remote from the arm 73 is vertical and planer. The mandrel index is pivotally connected to the junction between the indexing plate 76 and the composite charge index. The mandrel index includes a beveled protrusion 75 that extends outwardly, toward the interior of the vacuum chamber when the mandrel index is in the deployed position. When in the deployed position, the mandrel index rests against the composite charge index 72.

Figures 3, 4:
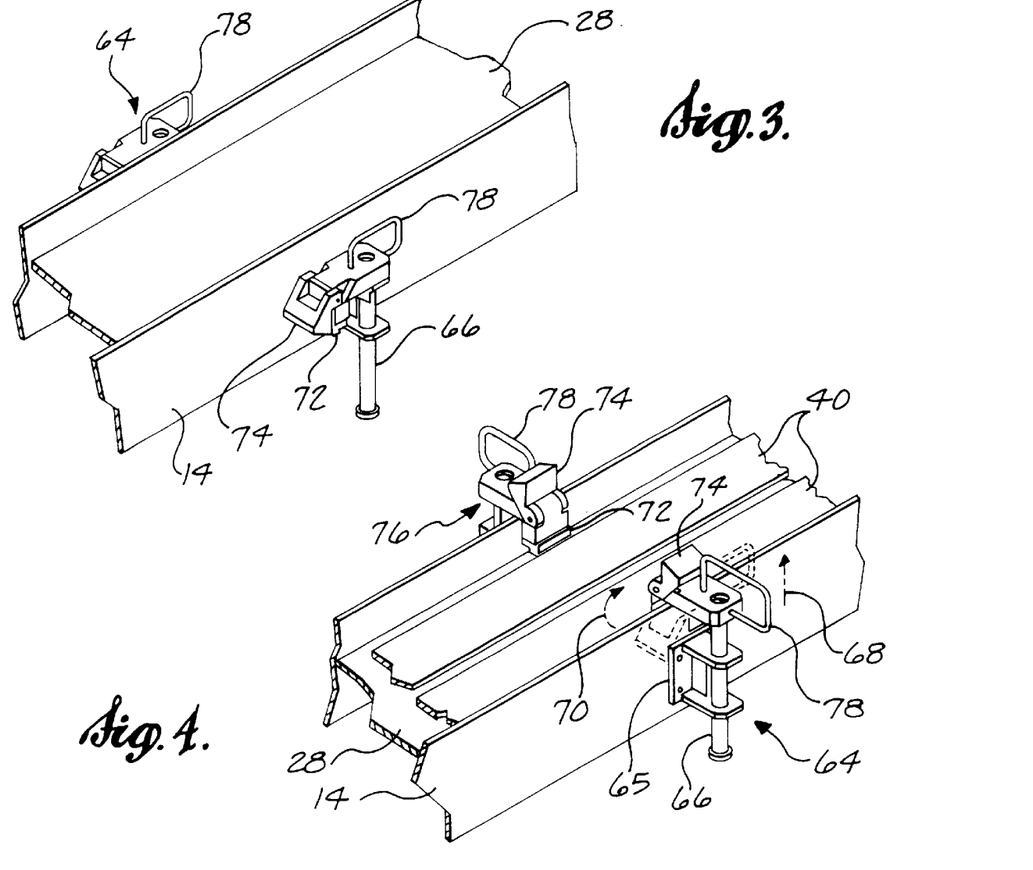
FIG. 3 is an enlarged perspective view of two side indexes in their stowed position.
FIG. 4 is an enlarged perspective view of the two side indexes in their charge indexing position.
Figure 6:
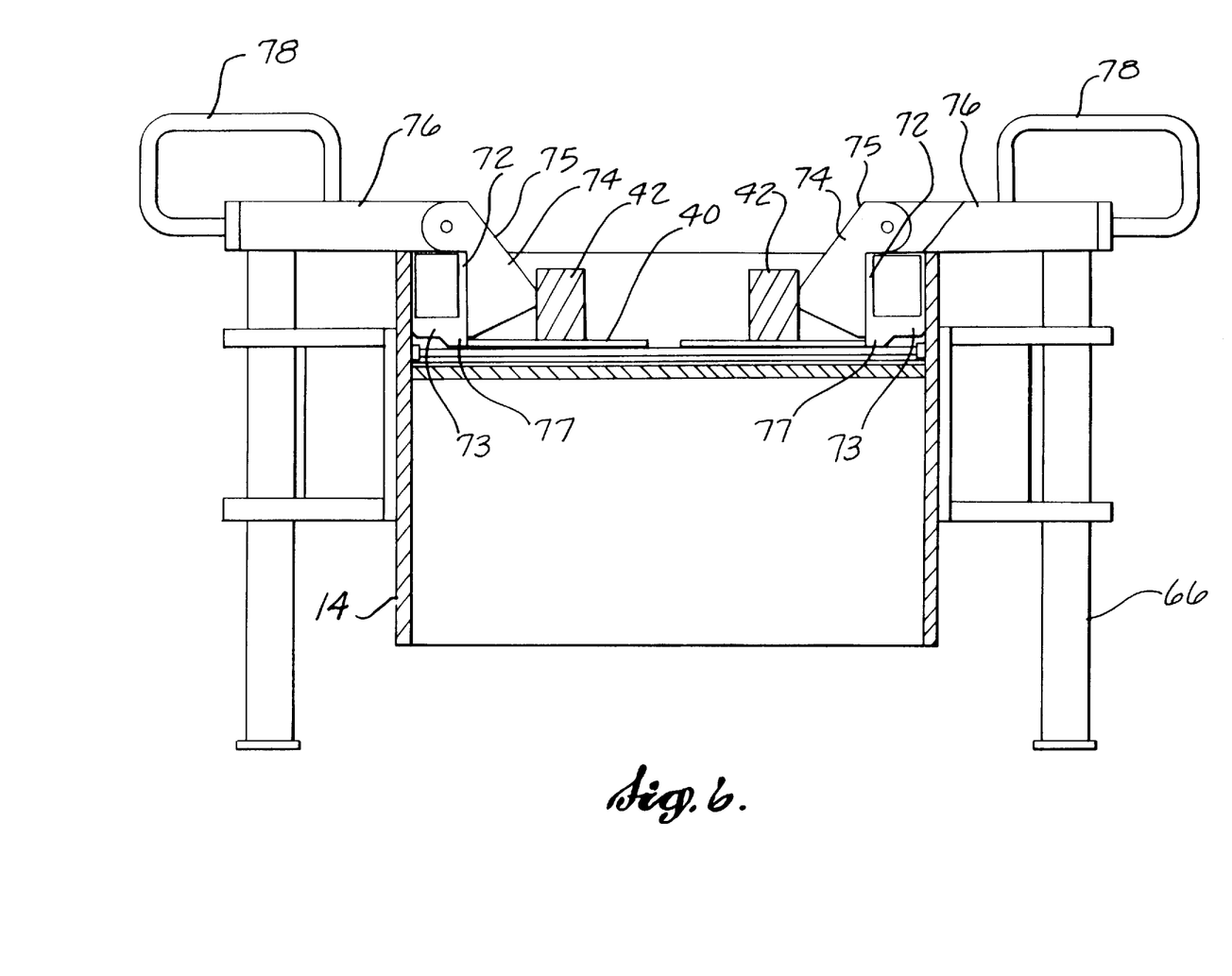
FIG. 6 is a cross section of the composite hot drape vacuum former of FIG. 1 showing two side indexes in their lay-up mandrel indexing position.

After the composite charges 40 are placed within the vacuum chamber, the side indexes are moved from a stowed position (FIG. 3) to a deployed or indexing position (FIG. 4). In the stowed position, the longitudinal axes of the indexing plates 76 lie parallel to the longitudinal axis of the vacuum chamber and the cylinders 66 are in a lowered position such that the bottom of the plates lie atop the upper arm of the U-shaped bracket 65. The side indexes are deployed by lifting and rotating them into position as illustrated in FIG. 4 whereat the longitudinal axis of the indexing plates lie orthogonal to the longitudinal axis of the vacuum chamber 12. Each side index is then lowered until the foot 77 of the composite charge index rests on the inflatable bladder 28 and the arm of the composite charge index rests against the inner surface of the wall of the housing 14 of the vacuum chamber 12. The vertical planer side of the charge indexing plate 72 is used to position the composite charges 40 across the width of the vacuum chamber. After the side indexes are all lowered, an operator manually positions the outer edge of each composite charge against the vertical planer side of each charge indexing plate 72 (FIGS. 4 and 6).

Enough side indexes 64 should be included to ensure that the composite charges 40 are properly located over their entire length. If the spacing of the side indexes is too wide, the composite charges may bend, resulting in misalignment of the composite charges and the lay-up mandrels.

Figure 5:
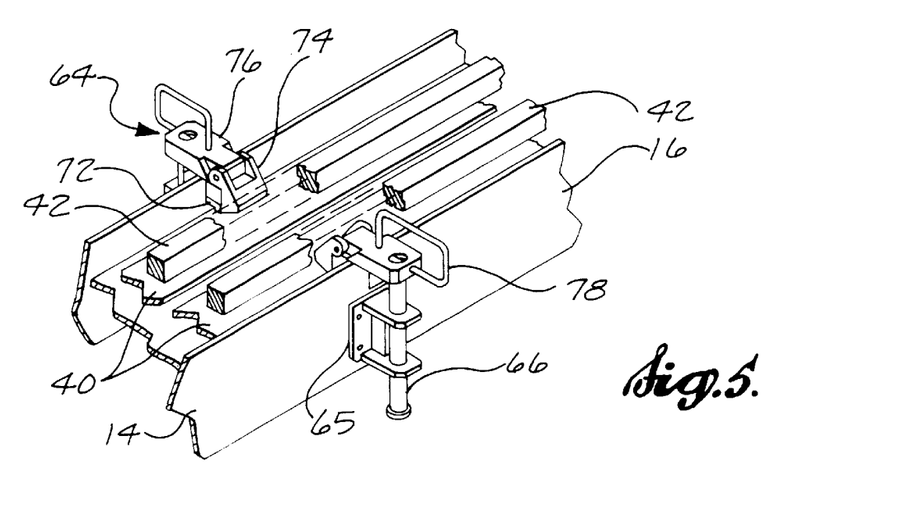
FIG. 5 is an enlarged perspective view of the two side indexes in their lay-up mandrel indexing position.

After each composite charge 40 is positioned, the mandrel indexes are moved from their non-deployed positions (FIG. 4) to their deployed positions (FIGS. 5 and 6) and a lay-up mandrel 42 is placed on top of each composite charge. In the non-deployed position, as illustrated in FIG. 4 and discussed above, the mandrel indexes are rotated upward so as to lie atop the indexing plates 76 where they do not interfere with the placement of the composite charges 40. In the deployed position, the mandrel indexes are rotated downward (FIG. 5), until they impinge on the composite charge indexes 72. When in this position, beveled protrusions 75 of the mandrel indexes partially overlie the top of the composite charges 40. The beveled protrusions 75 (FIG. 6) assist in positioning the lay-up mandrels 42 as they are lowered into the vacuum chamber.

Figure 8:
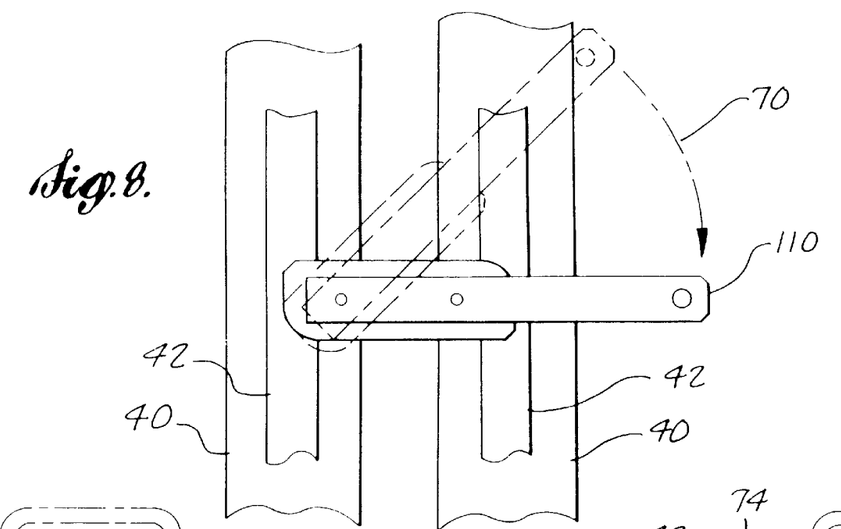
FIG. 8 is a top view illustrating the use of a spreader bar.
Figure 9:
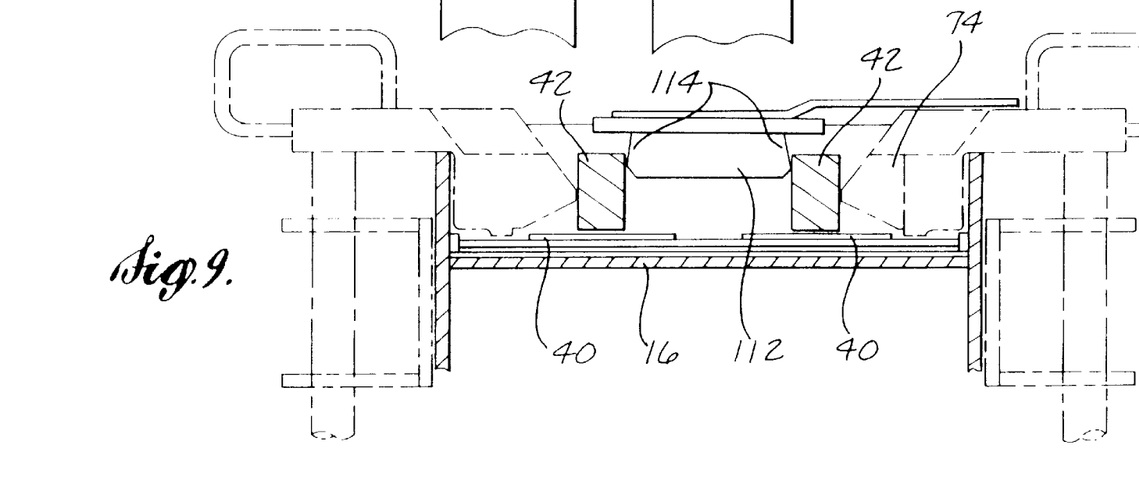
FIG. 9 is a partial cross section of the composite hot drape vacuum former of FIG. 1 illustrating the use of the spreader bar.

After the mandrel indexes are rotated into their deployed positions, the lay-up mandrels 42 are lowered into the interior of the vacuum chamber 42 using an articulating arm, crane or other device. The lay-up mandrels 42 are lowered until they are in line with the mandrel indexes 74 but have not contacted the composite charges 40. The lay-up mandrels 42 are then pushed against the tips of the beveled protrusions 75 of the mandrel indexes 74 using a plurality of spreaders 110, as illustrated in FIG. 8.

Each spreader 110 includes a lever handle having one end joined to a downwardly extending spreader block 112. Each spreader block 112 is elongate, tapers outwardly and has rounded edges 114 located at opposite ends. The spreader blocks 112 are placed between the two lay-up mandrels 42 as shown in phantom in FIG. 8. The spreader blocks 112 are then rotated by rotating the lever handle as illustrated FIG. 8. As the spreader blocks 112 are rotated, the rounded edges of the spreader blocks contact and push the lay-up mandrels 42 apart into contact with the tips of the beveled protrusions 75 of the mandrel indexes 74. After the lay-up mandrels 42 are pushed against the tips of the beveled protrusions, the lay-up mandrels are lowered into contact with the composite charges 40.

Figure 13:
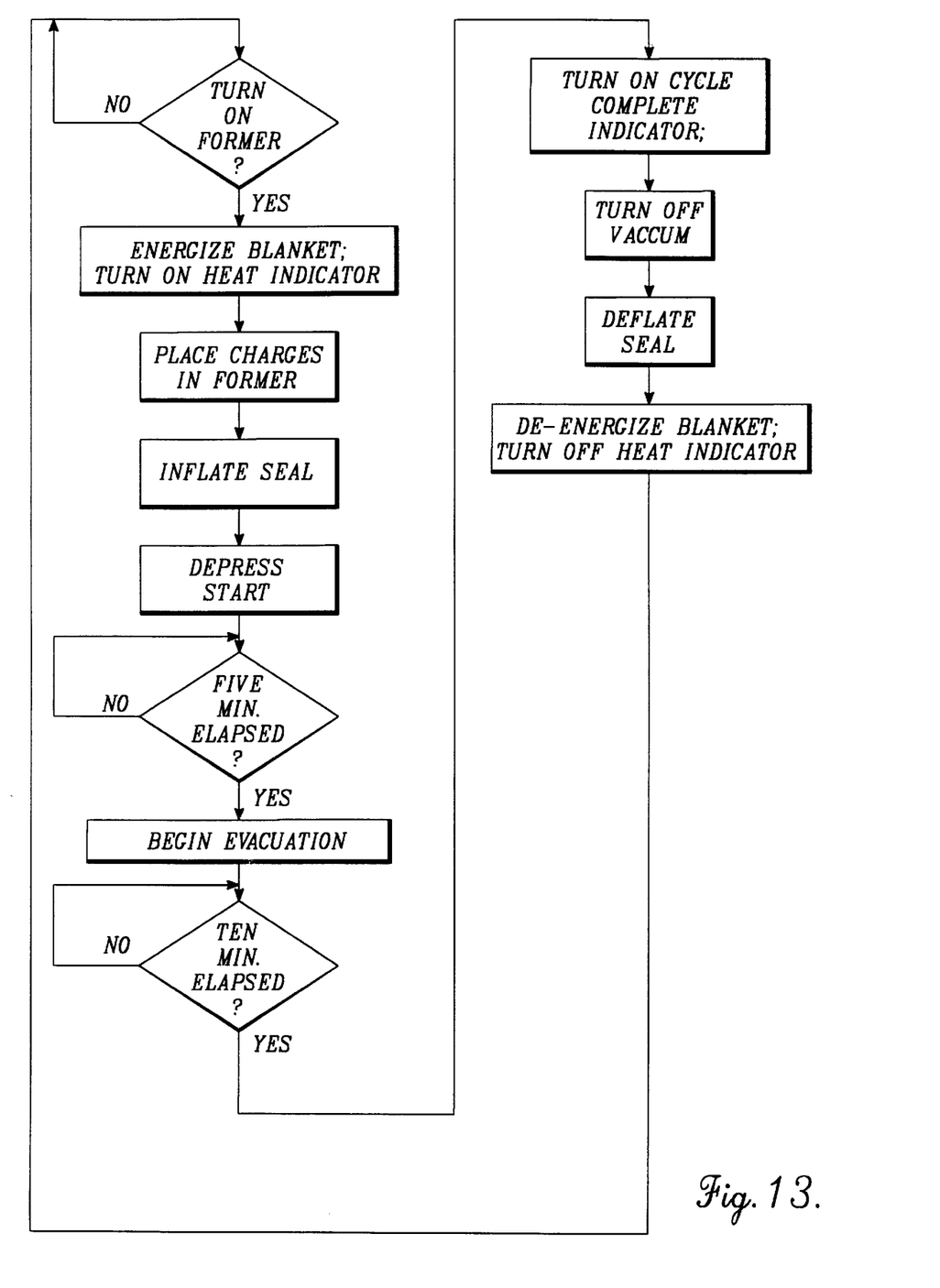
FIG. 13 is a flow diagram illustrating the operation of the composite hot drape former of FIG. 1.

Next, the spreaders 110 are removed, the lid 14 of the vacuum chamber is closed and forming is begun. Prior to using the vacuum former, as shown in FIG. 13, the former is turned on. When the former is turned on, power is provided to the heating blanket to preheat the heating blanket. Simultaneously, a heat-on indicator 136 on the control panel is illuminated. In one actual embodiment of the invention, the heating blanket 36 is maintained at a temperature of approximately 145° F. The heat provided by the heating blanket 36 elevates the temperature of the composite charges after they are placed within the chamber. This softens the resin of the charges and makes them easier to form. The heating blanket is maintained at approximately 145° F. throughout the forming process.

After the composite charges and mandrels have been placed within the vacuum former, the inflatable seal 26 is pressurized by depressing the seal inflate button 132 on the control console (FIG. 1). This causes the valve of a pressure source (not shown) to close and supply pressurized air to the inflatable seal 26. As a result, the inflatable seal expands and seals the vacuum chamber, creating an air-tight cavity. After the vacuum chamber is sealed, the forming cycle is begun by depressing a start button 130 on the control console.

Returning to FIG. 13, after five minutes, the control console 20 closes a switch that causes the vacuum pump 18 to begin evacuating the interior 38 of the vacuum chamber. In one actual embodiment of the invention, the vacuum pump 18 is connected to the interior of the vacuum chamber 38 through a series of passages (not shown) that lie along the length of the lid 14 and extend into the interior 38 of the vacuum chamber. Multiple passages that extend into the interior of the vacuum chamber at various positions along the length of the vacuum chamber are used to ensure that the vacuum chamber is evenly evacuated.

Figure 12:
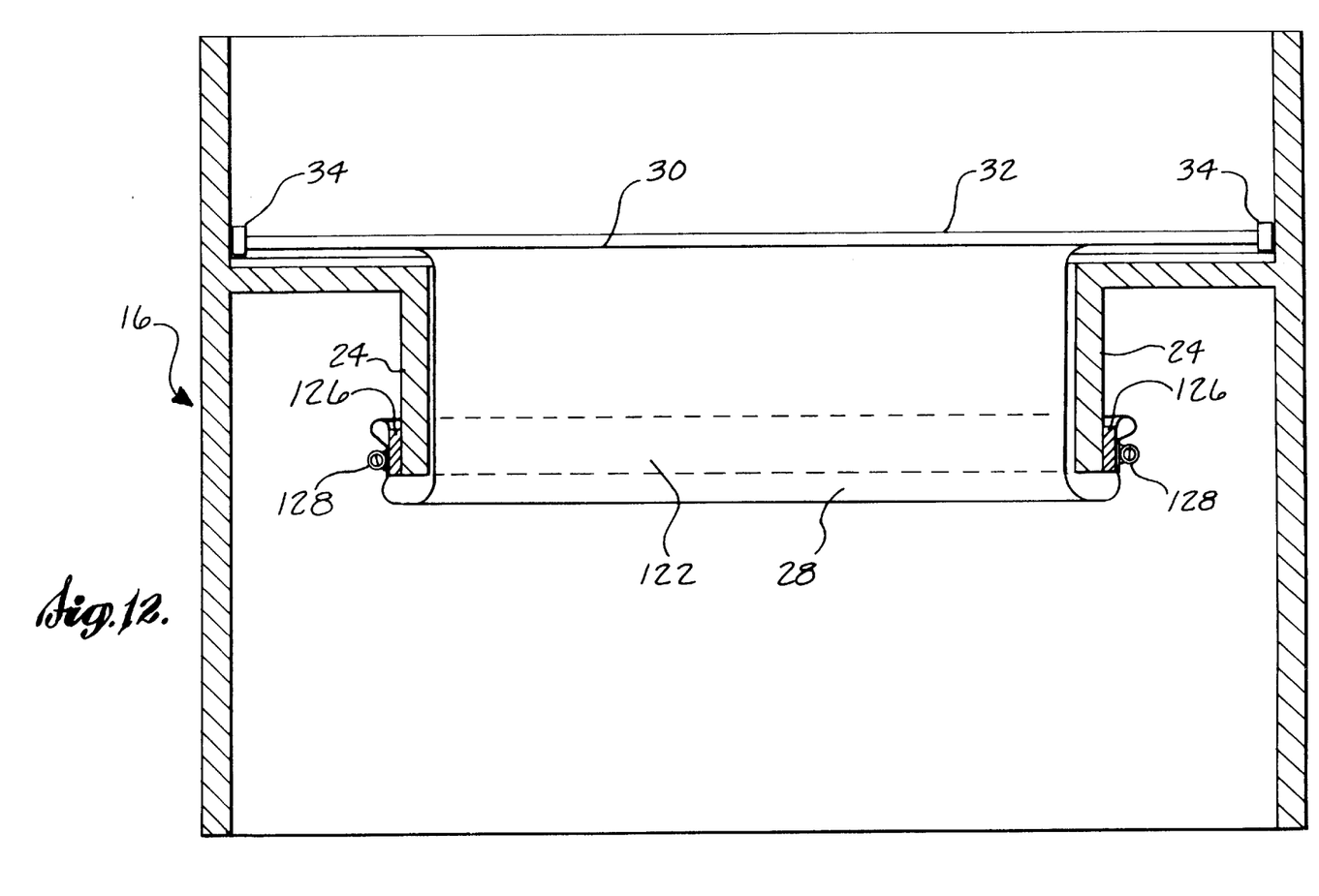
FIG. 12 is a cross section of the composite hot drape vacuum former and inflatable bladder connection.

As the interior 38 of the vacuum chamber is evacuated, a pressure differential is created between the interior of the vacuum chamber and the interior 39 of the inflatable bladder. This pressure differential causes air to rush into the inflatable bladder 28 through the holes 122 (FIGS. 2 and 12). As the inflatable bladder inflates FIG. 11), it moves upward forming the composite charges 40 around the sides of the lay-up mandrels 42.

It has been found advantageous to slowly evacuate the vacuum chamber over approximately a five-minute time span. This allows the individual layers of composite to move with respect to each other during forming. Such movement helps prevent creasing or wrinkling of the charges during forming. It is also advantageous to have the control console 20 maintain the vacuum for approximately five minutes after forming is complete to help consolidate the composite charges.

After the forming cycle is complete, the control console illuminates a cycle complete indicator 137. An operator may then allow the pressure differential between the interior and exterior of the vacuum chamber to equalize by depressing a vacuum off button 140. Once the pressure differential has equalized, the operator may deflate the inflatable seal 26 by depressing a seal deflation button 134. After the inflatable seal 26 is fully deflated, the operator lifts the lid 14 and removes the composite lay-up mandrels and formed composite charges. After the operator is done using the vacuum former, it may be turned off, thus de-energizing the heating blanket.

The vacuum former may be switched off during the forming cycle. This causes the vacuum pump to be turned off, deflates the inflatable seal, and de-energizes the electric blanket.

Preferably, the formed composite charges and lay-up mandrels are removed using an articulating arm as described in a copending patent application. Alternatively, a standard crane or other lift-type device could be used. Once removed, the composite charges may be joined to form I-beams or may be cured as C-channels depending upon the application of the resulting structure.

While a preferred embodiment of the invention has been illustrated and described, it will be appreciated that within the scope of the appended claims various changes can be made therein. For example, the heating blanket could be divided into more than one heating zone. Each heating zone could then be separately energized in order to form composite charges that extend over only part of the length of the forming chamber.

The embodiments of the invention in which an exclusive property or privilege is claimed are defined as follows:

1. A method of forming a composite charge prior to curing, comprising the steps of:

(a) laying up an elongate composite charge;
   (b) placing the composite charge in an elongate vacuum chamber adjacent and on top of an inflatable bladder, the interior of the inflatable bladder being in fluid connection with the exterior of the vacuum chamber;
   (c) moving a plurality of indexes mounted on the side of the elongate vacuum chamber from a stowed position to a deployed position in which the indexes help to position the composite charge at a predetermined location within the vacuum chamber;
   (d) placing an elongate lay-up mandrel on top of and in physical contact with the composite charge;
   (e) moving the indexes back to the stowed position in which the indexes are located external to the vacuum chamber;
   (f) sealing the vacuum chamber with an inflatable seal disposed between a lid of the vacuum chamber and a body of the vacuum chamber;
   (g) elevating the temperature of the composite charge; and
   (h) at least partially evacuating the inside of the vacuum chamber, causing the inflatable bladder to expand and form the composite charge upward around the lay-up mandrel.

2. The method of claim 1, further comprising the step of maintaining the composite charge at an elevated temperature for a sufficient time to allow the resin in the composite charge to soften but not to cure.

3. The method of claim 2, further comprising moving a plurality of subindexes, mounted on the indexes, from a retracted position to an extended position in which the subindexes help to position the lay-up mandrel at a predetermined position with respect to the composite charge.

4. The method of claim 3, further comprising the step of moving end indexes from a retracted position to an indexing position in which said end indexes help to position the ends of the composite charges and the lay-up mandrels within the vacuum chamber.

5. The method of claim 1, further comprising moving a plurality of subindexes, mounted on the indexes, from a retracted position to an extended position in which the subindexes help to position the lay-up mandrel at a predetermined position with respect to the composite charge.

6. The method of claim 5, further comprising the step of moving end indexes from a retracted position to an indexing position in which said end indexes help to position the ends of the composite charges and the lay-up mandrels within the vacuum chamber.

7. The method of claim 1, further comprising the step of moving end indexes from a retracted position to an indexing position in which said end indexes help to position the ends of the composite charges and the lay-up mandrels within the vacuum chamber.

* * * * *